June 1, 1954
R. J. HERCOCK
2,680,200
EXAMINATION OF PHOTOGRAPHIC MATERIALS
Filed July 6, 1951
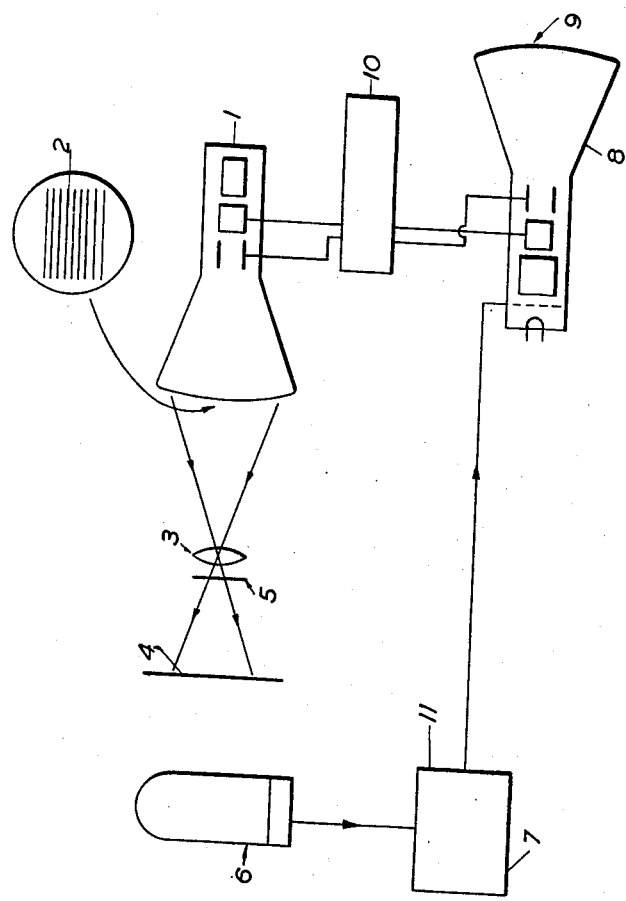
Inventor
Robert James Hercock
By
Stevens, Davis, Miller & Mosher
his Attorneys Patented June 1, 1954

2,680,200

UNITED STATES PATENT OFFICE 2,680,200

EXAMINATION OF PHOTOGRAPHIC MATERIALS

Robert James Hercock, Ilford, England, assignor to Ilford Limited, Ilford, England, a British company Application July 6, 1951, Serial No. 235,525

Claims priority, application Great Britain July 24, 1950

2 Claims. (Cl. 250—83.3)

This invention relates to the inspection of light-sensitive photographic film and the apparatus therefor.

It is important in the manufacture of photographic film that the film should be free from blemishes which might appear in, or affect, the photographic record obtained on it. Accordingly it is customary to examine the film at a suitable stage between its manufacture and packing in order to locate blemishes thereon and to remove the blemished portions of film thus located. The examination of the film may be carried out visually, but owing to the light-sensitivity of the film a very low degree of illumination with light that is substantially without effect on the film is all that is permissible. Thus, with film sensitive only to blue light an orange inspection light is permissible, with film sensitive also to green a red light is permissible, and with panchromatic film the inspection has to be carried out in a dim green light. Evidently, therefore, this inspection process is tedious and, because of the low degree of illumination, somewhat unsure.

According to the present invention, in a method of examining photographic light-sensitive film, the film is scanned with infra-red rays derived from a cathode ray tube having a screen which emits infra-red rays. The cathode ray tube has a television raster formed on its screen and this is focused on the film by a lens system. The energy transmitted by the film is then picked up by a photomultiplier having an infra-red sensitive cathode. The output signals obtained are amplified and applied to the grid of a second cathode ray tube having a fluorescent screen which emits light in the visible region of the spectrum. By applying the same scanning voltages to the two tubes synchronisation of the picture image in the second tube is ensured.

By this means there is obtained on the fluorescent screen of the second cathode ray tube an image of the film which may be watched to detect faults in the film. It will be appreciated that this result is achieved without the necessity of subjecting the film to illumination to which it has any substantial sensitivity.

Suitable apparatus for carrying out the process of this invention is illustrated diagrammatically in the accompanying drawing.

Referring to this drawing, the apparatus comprises a cathode ray tube 1 having a raster 2 on its face. The tube 1 emits infra-red rays. The raster 2 is focused by a lens system 3 on to the film 4 to be examined, the rays passing through an infra-red transmitting filter 5. The radiation emerging from the film 4 falls on an electron multiplier photocell 6 and the signals derived therefrom are transmitted to an amplifier 7 whence the control signals are derived at 11, and then on to the control grid of a second cathode ray tube 8 having a fluorescent screen 9 which emits light in the visible spectrum. The cathode ray tubes 1 and 8 are operated in synchrony by a common scanning generator 10.

In operation an image of the film 4 is formed on the screen 9 and this may be viewed to detect faults.

The method presents the important advantages that the contrast of the viewed image may be adjusted by varying the amplifier gain and that since the picture, by the sequential scanning, is spread out in time, rather than in space, the signals can be used for control purposes by, for example, calling attention to an excessive number of faults.

It will be appreciated that lengths of film may be continuously scanned by this method.

What I claim is:

1. Apparatus for examining photographic film which comprises a cathode ray tube having a raster formed on its screen and adapted to emit infra-red radiation, a lens system for focusing the said raster on a film to be examined during the passage of said film from one point to another, an infra-red transmitting filter in the focusing beam, an electron multiplier photocell arranged to receive infra-red radiation emerging from the film, an amplifier for the response of said photocell, a second cathode ray tube having a screen emitting light in the visible spectrum and means for controlling said second cathode ray tube in accordance with the response of said photocell, the said cathode ray tubes being operated in synchronism.

2. Apparatus according to claim 1 wherein the two cathode ray tubes are operated in synchrony by a common scanning generator.

References Cited in the file of this patent

UNITED STATES PATENTS

| Number | Name | Date |
|---|---|---|
| 1,605,395 | Ybarrondo | Nov. 2, 1926 |
| 2,102,139 | Vance | Dec. 14, 1937 |
| 2,215,365 | Vestergren | Sept. 17, 1940 |
| 2,319,195 | Morton | May 11, 1943 |
| 2,521,953 | Tuttle | Sept. 12, 1950 |